United States Patent
Yoshida et al.

(10) Patent No.: US 8,400,101 B2
(45) Date of Patent: Mar. 19, 2013

(54) POWER SUPPLY CONTROL CIRCUIT

(75) Inventors: Michio Yoshida, Miyoshi (JP); Takeshi Maenaka, Toyota (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 300 days.

(21) Appl. No.: 12/933,487

(22) PCT Filed: Mar. 4, 2009

(86) PCT No.: PCT/JP2009/054034
§ 371 (c)(1),
(2), (4) Date: Sep. 20, 2010

(87) PCT Pub. No.: WO2009/116931
PCT Pub. Date: Sep. 24, 2009

(65) Prior Publication Data
US 2011/0018491 A1    Jan. 27, 2011

(30) Foreign Application Priority Data

Mar. 21, 2008   (JP) .................................. 2008-073824

(51) Int. Cl.
*H02J 7/00* (2006.01)
*H01M 10/44* (2006.01)
*H01M 10/46* (2006.01)

(52) U.S. Cl. ........................................ 320/101; 320/103
(58) Field of Classification Search .................. 320/101, 320/103
See application file for complete search history.

(56) References Cited

U.S. PATENT DOCUMENTS

| | | | |
|---|---|---|---|
| 7,354,671 B2 * | 4/2008 | Ishikawa et al. | 429/432 |
| 2003/0194586 A1 * | 10/2003 | Sugiura et al. | 429/13 |

FOREIGN PATENT DOCUMENTS

| | | |
|---|---|---|
| DE | 11 2006 001 469 T5 | 4/2008 |
| JP | 2004-281219 A | 10/2004 |
| JP | 2005-051837 A | 2/2005 |
| JP | 2007-005038 A | 1/2007 |
| JP | 2008-103228 A | 5/2008 |
| WO | 2004/082040 A2 | 9/2004 |
| WO | 2007/093882 A2 | 8/2007 |
| WO | 2009/057383 A1 | 5/2009 |
| WO | 2009/057384 A1 | 5/2009 |

* cited by examiner

*Primary Examiner* — Samuel Berhanu
(74) *Attorney, Agent, or Firm* — Kenyon & Kenyon LLP

(57) ABSTRACT

In order to more rapidly warm up a battery device in a power supply equipped with a fuel cell and a battery device, a fuel-cell-mounted vehicle driving system for driving and controlling a rotating electric machine installed on a vehicle comprises an inverter connected to the rotating electric machine; a power supply circuit having a battery device, a voltage converter, and a fuel cell; and a power supply control device for controlling the power supply circuit. The power supply control device includes an FC output voltage setting module for setting the output voltage of the fuel cell, an OCV avoidance module for, when an FC output voltage is set, avoiding a voltage around an OCV, a battery warm-up control determination module for determining whether the battery device is under warm-up control or not, and an OCV avoidance release module for, when the battery device is under the warm-up control, releasing the OCV avoidance.

4 Claims, 3 Drawing Sheets

POWER SUPPLY CONTROL CIRCUIT

This is a 371 national phase application of PCT/JP2009/054034 filed 4 Mar. 2009, claiming priority to Japanese Patent Application No. JP 2008-073824 filed 21 Mar. 2008, the contents of which are incorporated herein by reference.

TECHNICAL FIELD

The present invention relates to a power supply control circuit, and more particularly to a power supply control circuit which controls an operation of a power supply including a battery device and a fuel cell.

BACKGROUND ART

Fuel cells are often selected for installation on vehicles because of their lower impact on the environment. To obtain an operating point for controlling such a fuel cell, the current-voltage characteristics, i.e. the I-V curve, are often used as output characteristics of the fuel cell. The intersection of this I-V curve and a required power curve is set as an operating point.

In a fuel cell I-V curve, the output voltage has a maximum value when the current is 0. As the state in which the current value is 0 corresponds to a state in which both output terminals of the fuel cell are opened, the voltage at this time is referred to as an Open Circuit Voltage (OCV). When the current is increased from this OCV state, the voltage value of the fuel cell abruptly decreases and is then kept at a fixed value, and a region in which the output voltage does not change significantly even with the increase in the current value continues. When the current value further increases beyond this region in which the output voltage of the fuel cell is stable, the voltage value then sharply drops from the fixed value to 0. As such, the I-V curve of the fuel cell exhibits non-linearity due to the electrochemical reaction of the fuel cell, in which the output voltage of the fuel cell sharply changes near the OCV and the region in which the current value is great. Because degradation of a catalyst which is one structural component of a fuel cell is accelerated when the fuel cell is operated near the OCV, setting of the operating point of the fuel cell is performed while avoiding the region near the OCV.

For example, Japanese Patent Publication JP 2007-5038 A (Patent Document 1) indicates that, in a fuel cell system, the output characteristics of a fuel cell are degraded due to a sintering phenomenon when the output voltage of the fuel cell changes over the oxidation-reduction potential in accordance with a fluctuation in the system required voltage. Accordingly, when the FC required power is less than the oxidation-reduction power, the FC output voltage is set to an OCV (open circuit voltage) such that power is not generated, whereas, when the FC required power is greater than the oxidation-reduction power, the FC output voltage is set to a voltage corresponding to the required power. Then, even when the FC required power subsequently decreases to fall below the oxidation-reduction power, the FC output voltage is set to the oxidation-reduction potential during a continued time period reaching the fitness value β, thereby continuing power generation. Once the fitness value β is exceeded, power generation is no longer necessary, and no power is generated. As described above, Patent Document 1 describes avoiding the FC output voltage from changing over the oxidation-reduction potential.

Patent Document 1: JP 2007-5038 A

DISCLOSURE OF INVENTION

Technical Problems

As described above, the operating point of the fuel cell is set while avoiding points near the OCV. Because the fuel cell here is not a secondary battery, a high voltage battery device is generally used along with the fuel cell in preparation of load fluctuation and soon. The battery device and the fuel cell are connected in parallel with each other, and distribution of the power from each is performed in accordance with the required power of a load. For example, when sufficient power to meet load requirements cannot be supplied only by power generation of the fuel cell, the battery device is discharged to supply power corresponding to the deficiency. On the other hand, when the amount of charge of the battery device is low, additional power beyond that required for the current load is generated by the fuel cell and supplied to the battery device to recharge it.

Additionally, at low temperatures the output power of the battery device is lowered and the power storage ability of the battery device is also reduced. Accordingly, when the outside-air temperature is at a certain level of low temperature, control is performed to increase the temperature of the battery device. For example, the battery device is controlled to forcibly repeat discharging and charging. With the repetition of forcible charge and discharge, the temperature of the battery device gradually increases as it is activated.

As described above, if setting of the output voltage of the fuel cell is performed while avoiding the region near the OCV during the forcible discharge of the battery device for the purpose of warm-up control, the output current of the fuel cell will have a considerably high value. Consequently, even if it is desired to discharge the battery device, the battery device will be charged by the output current of the fuel cell. Specifically, there arises a problem that the forcible discharge of the battery device become insufficient and a much time is required to warm up the battery device.

In consideration of the above, the present invention provides an advantageous power supply control device which is capable of controlling a power supply circuit including a fuel cell and a battery device to more quickly warm up the battery device.

Solution to Problems

In accordance with the present invention, there is provided a power supply control device, including an unit which performs power distribution between a battery device and a fuel cell to set a target output voltage of the fuel cell corresponding to required power distributed to the fuel cell; an open circuit voltage avoidance unit which, when setting the target output voltage, sets the target output voltage with a voltage range between an open circuit voltage of the fuel cell and a predetermined threshold upper limit voltage which is lower than the open circuit voltage being set as an avoidance voltage region; an unit which determines whether or not the battery device is under warm-up control by means of forcible charge or discharge; and an open circuit voltage avoidance release unit which, when it is determined that the battery device is under the warm-up control, can set the target output voltage within a range including the avoidance voltage region.

In a power supply control device according to the present invention, the open circuit voltage avoidance release unit preferably makes a settable range at the time of discharge within which the target output voltage can be set during the forcible discharge of the battery device different from a settable range at the time of charge within which the target output voltage can be set during the forcible charge of the battery device.

In a power supply control device according to the present invention, the open circuit voltage avoidance release unit also preferably sets the settable range at the time of discharge between the open circuit voltage and a predetermined discharge time threshold lower limit voltage which is smaller than the open circuit voltage and equal to or greater than the threshold upper limit voltage, and sets the settable range at the time of charge to a voltage which is equal to or less than the threshold upper limit voltage.

A power supply control device according to the present invention further preferably includes a battery device charge and discharge unit which executes forcible charge and discharge control in accordance with a temperature of the battery device or a state of charge of the battery device.

Advantageous Effects of Invention

With the above structure, a power supply control device according to the present invention is capable of setting the target output voltage to avoid an avoidance voltage region which is between the open circuit voltage (OCV) of the fuel cell and a predetermined threshold upper limit voltage which has been preset to be lower than the open circuit voltage. When it is determined, based on determination as to whether or not the battery device is under warm-up control by forcible charge and discharge, that the battery device is under warm-up control, the power supply control device can set the target output voltage within the range including the avoidance voltage region. In the avoidance voltage region, in which the output current of the fuel cell is 0 or a small value, it is possible to prohibit charging of the battery device while the battery device is being forcibly discharged, thereby enabling the battery device to be warmed up rapidly.

Further, in the power supply control device, the settable range at the time of discharge, which is a range in which the target output voltage can be set when the battery device is being forcibly discharged is made to differ from the settable range at the time of charge which is a range in which the target output voltage can be set when the battery device is being forcibly charged. As such, it is possible to vary the output current of the fuel cell between when the forcible discharge is being performed and when the forcible charge is being performed. Consequently, the output voltage at the time of discharge can be set so as to accelerate discharging, and the output voltage at the time of charge, which differs from the output voltage at the time of discharge, can be set so as to accelerate charging.

Also, in the power supply control device, the settable range at the time of discharge is set to be between the open circuit voltage and the discharge time predetermined threshold lower limit voltage which is preset to a voltage which is less than the open circuit voltage and is equal to or greater than the threshold upper limit voltage, and the settable range at the time of charge is set to be a voltage which is equal to or less than the threshold upper limit voltage. As such, the settable range at the time of discharge can be set to be higher than the settable range at the time of charge, so that the output current of the fuel cell can be a smaller value, possibly even 0, during at forcible discharging and can be a sufficiently great value during forcible charging.

In addition, in the power supply control device, as the forcible charge and discharge is executed in accordance with the temperature of the battery device, it is possible to perform, for example, the forcible charge and discharge control, i.e. release of the OCV avoidance control, only at a predetermined low temperature, to thereby minimize the degradation of the fuel cell, for example.

REFERENCE NUMERALS

10: fuel-cell-mounted vehicle driving system, 12: inverter, 14: rotating electric machine, 20: power supply circuit, 22: battery device, 24: voltage converter, 26: fuel cell, 28: battery temperature, 30: fuel cell, 40: power supply control device, 42: FC output voltage setting module, 44: OCV avoidance module, 46: battery warm-up control determination module, 48: OCV avoidance release module.

BEST MODE FOR CARRYING OUT THE INVENTION

A preferred embodiment of the present invention will be described with reference to the drawings. While in the following example, the present invention is applied to a vehicle driving system in which a fuel cell and a rotating electric machine are installed, the present invention may be applied to other systems, as long as such systems include a power supply circuit including a fuel cell and a battery device. For example, it is not necessary that a rotating electric machine serving as a load be provided, and the load may be an electric device other than the rotating electric machine, such as an auxiliary machine which operates with a high voltage.

Further, while the structure including a high voltage battery device, a fuel cell, and a voltage converter will be described as a power supply circuit, the power supply circuit may include other elements. For example, a system main relay, a low voltage battery, a low voltage operation DC/DC converter, a smoothing capacitor, and so on may be included. In addition, values such as each power value used in the following example are only examples for explanation, and may be other values.

Figure 1:
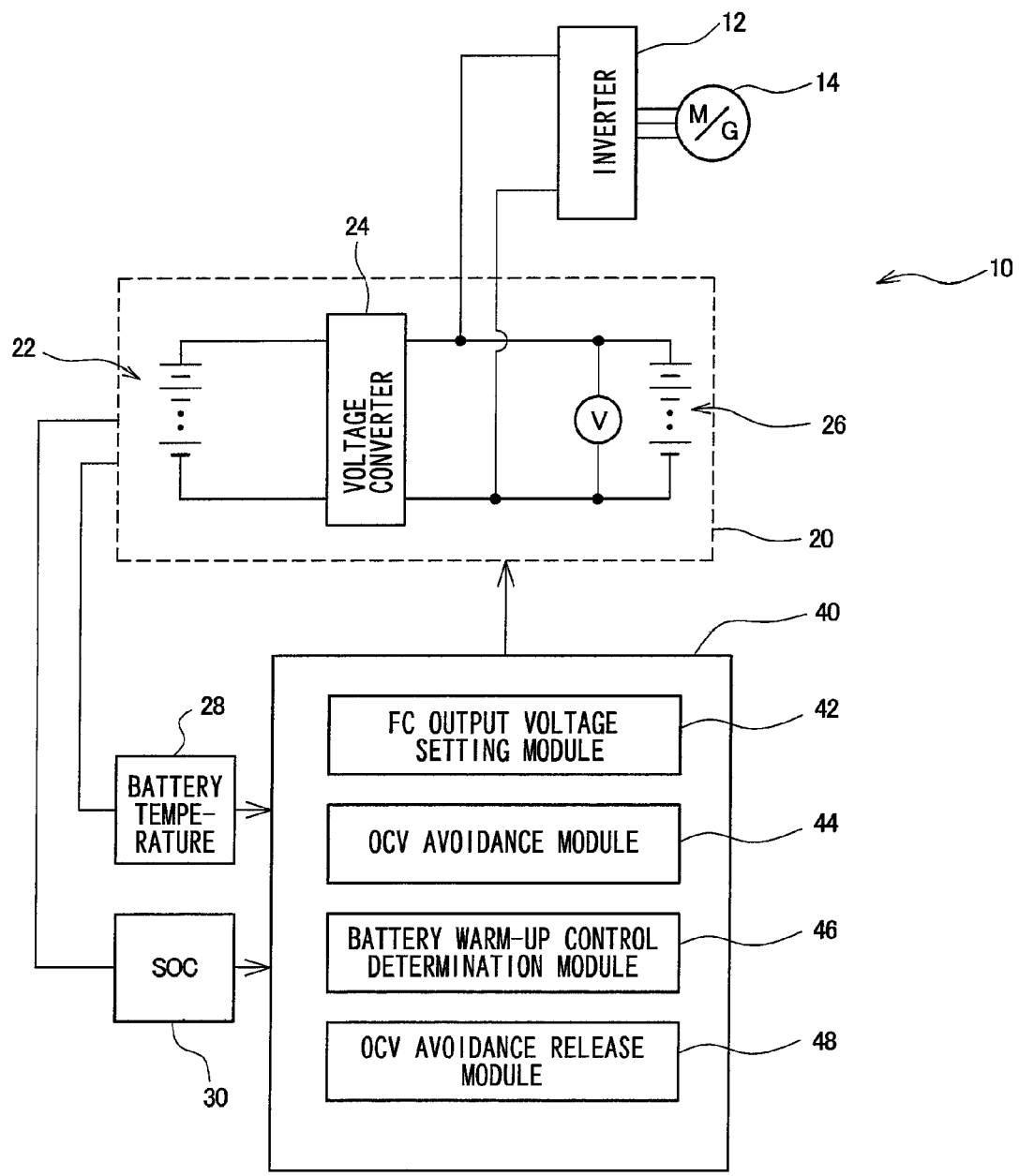
FIG. 1 is a view illustrating a structure of a driving system for a fuel-cell-mounted vehicle, including a power supply control device according to an embodiment of the present invention.

FIG. 1 is a view illustrating a structure of a fuel-cell-mounted vehicle driving system 10 including a power supply control device 40. The fuel-cell-mounted vehicle driving system 10 is a system for driving and controlling a rotating electric machine 14 installed on a vehicle, and includes an inverter 12 connected to the rotating electric machine 14, a power supply circuit 20 having a battery device 22, a voltage converter 24, a fuel cell 26, and a power supply control device 40 for controlling the power supply circuit 20.

In this example, the rotating electric machine 14 is a motor generator (M/G) installed on a vehicle, and is a three-phase synchronous type rotating electric machine which functions as a motor when an electric power is supplied thereto and functions as a generator when braking is applied.

The inverter 12 is a circuit having a function of converting high voltage direct current power to alternating current three-phase driving power and supplying the converted power to the rotating electric machine 14 and a function of converting alternating current three-phase regeneration power to high voltage direct current charging power, under control of the power supply control device 40. Such an inverter 12 can be formed of a circuit including a switching element, a diode, and so on.

The battery device 22 in the power supply circuit 20 is a chargeable and dischargeable high voltage secondary battery, which is connected with the fuel cell 26 via the voltage converter 24, and has a function corresponding to changes in the load, such as the inverter 12, the rotating electric machine 14, and so on. As such a battery device 22, a lithium ion battery pack or a nickel metal hydride battery pack, or a capacitor or the like may be used. As the battery device 22 is generally referred to as a battery, in the following description, the term "battery" will refer to a battery device.

The output voltage, the output current, the storage ability, and so on, of the battery device 22 vary depending on the temperature of the battery 22. Accordingly, the measured temperature of the battery device 22 is transmitted as the battery temperature 28 to the power supply control device 40. Further, SOC (State Of Charge), which is a charged state of the battery device 22 is also transmitted to the power supply control device 40.

The voltage converter 24 is a circuit which is disposed between the battery device 22 and the fuel cell 26. For example, when the power of the fuel cell 26 is insufficient, power is supplied from the side of the battery device 22 through the voltage converter 24 to the load, and when charging the battery device 22 the power is supplied to the battery device 22 from the side of the fuel cell 26 through the voltage converter 24. As such a voltage converter 24, a bidirectional converter including a reactor can be used.

The fuel cell 26 is one type of battery pack formed by a combination of a plurality of fuel cells such that generated power with high voltage of about 200V to about 400V can be extracted, and is referred to as a fuel cell stack. Here, each fuel cell has a function of extracting necessary power due to electrochemical reaction through an electrolyte membrane which is a solid polymer membrane when hydrogen is supplied as fuel gas to the anode side and air is supplied as oxidation gas to the cathode side. The I-V characteristics, which are the output characteristics of the fuel cell 26, will be described in detail below. Further, the fuel cell may be abbreviated as FC (Fuel Cell). Accordingly, in the following description, the term "FC" will refer to a fuel cell.

The power supply control device 40 has a function of controlling the operation of the inverter 12 and each of elements forming the power supply circuit 20, and particularly in this example, a function of appropriately performing setting of an operating point of the fuel cell 26 such that warm-up control of the battery device 22 can be performed rapidly. Such a power supply control device 40 can be formed of an electric control unit (ECU) which is suitably provided on a vehicle. Specifically, the power supply control device 40 can be formed of a computer or the like which is suitably provided on a vehicle.

The power supply control device 40 includes an FC output voltage setting module 42 for setting the output voltage of the fuel cell, an OCV avoidance module 44 for avoiding the voltage around the OCV at the time of setting the FC output voltage, a battery warm-up control determination module 46 for determining whether or not the battery device 22 is under the warm-up control, and an OCV avoidance release module 48 for releasing the OCV avoidance when the battery device 22 is under the warm-up control. These functions can be implemented by software, and, more specifically, can be implemented by execution of an FC output voltage setting program in a power supply control program. Alternatively, some portions of these functions may be implemented by hardware.

Figure 2:
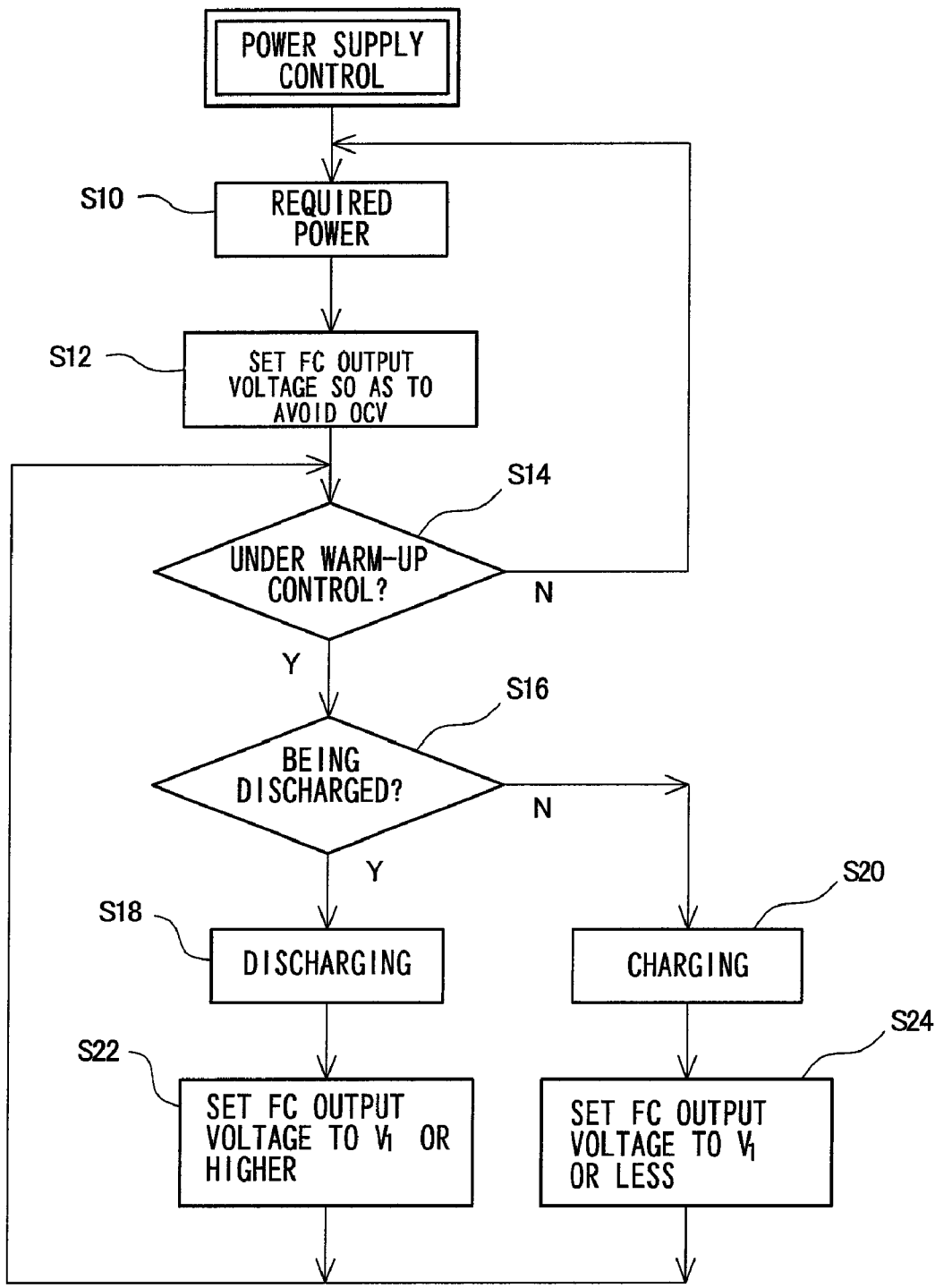
FIG. 2 is a flowchart illustrating the procedure of power supply control, particularly the procedure of FC output voltage setting when the battery device is under warm-up control according to the embodiment of the present invention.
Figure 3:
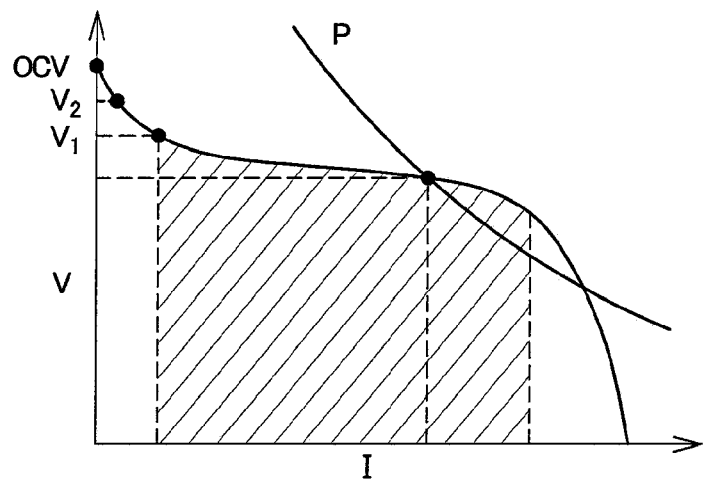
FIG. 3 is a view illustrating the I-V characteristics of the fuel cell and the range of output voltage setting according to the embodiment of the present invention.
Figure 4:
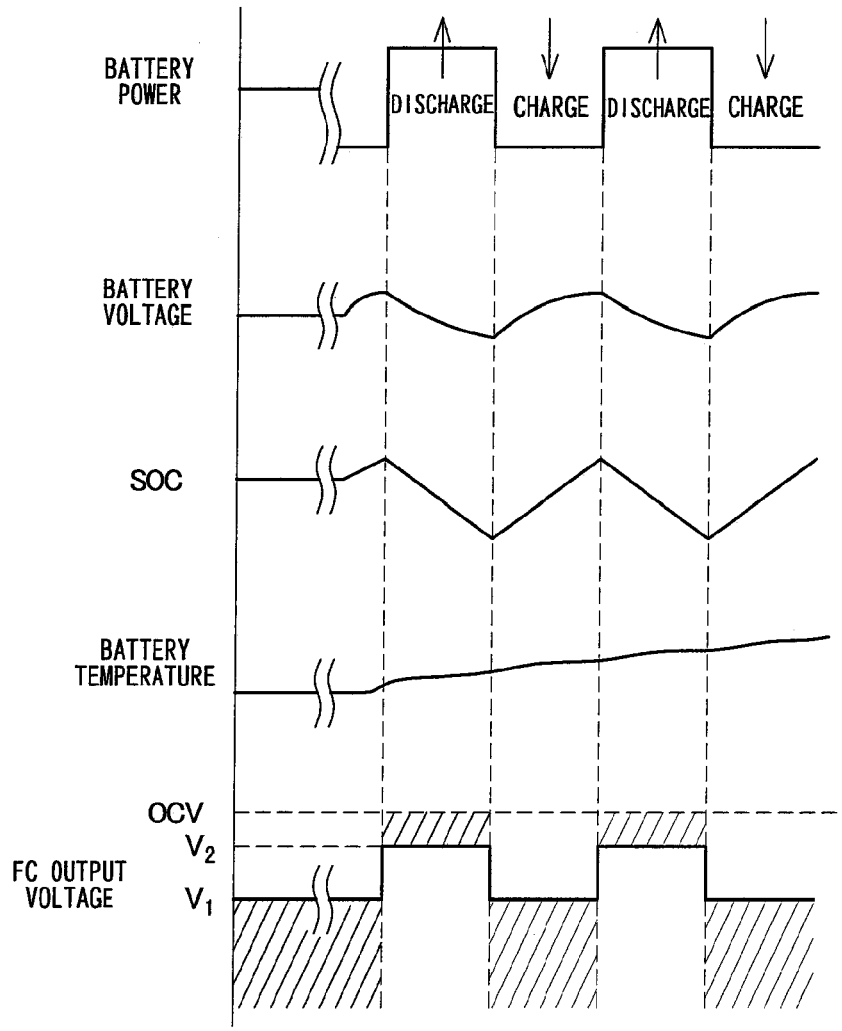
FIG. 4 is a view illustrating a change of each element when the battery device is under warm-up control according to the embodiment of the present invention.

The operation of a system with the above structure, particularly each of the functions of the power supply control device 40, will be described in detail with reference to the flowchart of FIG. 2, and FIGS. 3 and 4. In the following description, the reference signs in FIG. 1 will be used. FIG. 2 is a flowchart illustrating the processing of power supply control, and particularly the processing of FC output voltage setting when the battery device 22 is under warm-up control. FIG. 3 is a view illustrating the I-V characteristics or I-V curve of the fuel cell 26. FIG. 4 is a view illustrating a change of each element when the battery device 22 is under the warm-up control.

As shown in FIG. 2, in power supply control, the magnitude of required power is generally transmitted to the power supply control device 40 based on the operation state of the rotating electric machine 14 (S10). For example, a value of P(kW) or the like is transmitted as the required power. Then, an operating point of the fuel cell 26 corresponding to the required power P is set. The processes up to this point are implemented by the function of the FC output voltage setting module 42. In the case of normal FC operation state, the FC output voltage is set while avoiding voltages near the OCV (S12). This process is implemented by the function of the OCV avoidance module 44.

FIG. 3 illustrates, as the output characteristics of the fuel cell 26, an I-V curve in which the horizontal axis represents the output current I and the vertical axis represents the output voltage V. As illustrated in FIG. 3, in the I-V curve of the fuel cell 26, the Open Circuit Voltage (OCV), which is a voltage when the current is 0, is the maximum voltage, and subsequently, with the increase in the current, the voltage value is steeply decreased and is then stabled at substantially a fixed value. Then, with the further increase in the current value, the voltage value is rapidly decreased once again, and is finally decreased to 0.

As described above, in the I-V curve of the fuel cell 26, while the output voltage changes steeply in the region in which the current value is small and the region in which the current value is great, the change of the output voltage with respect to the change of the current is relatively small and therefore the output voltage is substantially fixed in the region between the region in which the current value is small and the region in which the current value is great. Such a steep change in output voltage is based on the electrochemical reaction of the fuel cell 26, and, if the fuel cell 26 is used at a voltage near the OCV, for example, the fuel cell 26 may degrade. To mitigate this disadvantage, it is desirable that use of the fuel cell be limited to the hatched region illustrated in FIG. 3. In FIG. 3, a line when the required power P is fixed is illustrated, and a point of intersection of this line representing the required power P and the I-V curve of the fuel cell 26 corresponds to an operating point of the fuel cell 26 for outputting the required power P.

Because it is desirable that the voltage near the OCV be avoided when setting the operating point of the fuel cell 26 as described above, a threshold upper limit voltage $V_1$ which is the upper limit is defined in setting the output voltage of the fuel cell 26. The threshold upper limit voltage $V_1$ is the upper limit voltage value to be set when setting the output voltage as the operating point of the fuel cell 26. The threshold upper limit voltage $V_1$ is lower than the OCV and can be preset in accordance with the I-V curve of the fuel cell 26 and so on. The region between the OCV and the threshold upper limit voltage $V_1$ corresponds to the avoidance voltage region which is to be avoided when setting the output voltage of the fuel cell 26.

Referring again to FIG. 2, in the normal operation state of the fuel cell 26, the output voltage is set such that the avoidance voltage region near the OCV is avoided as in steps S12 and 14. Here, whether or not the battery device 22 is under warm-up control is first determined (S14). This process is executed by the function of the battery warm-up control determination module 46. For example, when the outside air is at a low temperature, the temperature of the battery device 22 is also low, and therefore the output voltage and the output current from the battery device 22 are lowered and the storage ability is also lowered. Accordingly, the power supply control device 40, when the battery temperature 28 is a predetermined temperature or lower, performs warm-up control so as to increase the temperature of the battery device 22. In this example, no special heating devices are used, and forcible charge and discharge is repeated with respect to the battery device 22. Consequently, the battery device 22 is activated and its temperature is increased.

The warm-up control of the battery device 22 is performed in consideration of the SOC 30 in addition to the battery temperature 28. For example, the warm-up control is started when the battery temperature 28 is decreased to a first temperature or less, and forcible discharge is performed when the SOC 30 is a first threshold value or higher, forcible charge is performed when the SOC 30 is lower than a second threshold value which is lower than the first threshold value, and the warm-up control is stopped when the battery temperature 28 is increased to reach a second temperature which is slightly higher than the first temperature.

The determination of the warm-up control in step S14 can be performed by determining whether or not a command to execute the warm-up control supplied from the power supply control device 40 to the power supply circuit 20 is output. Charge and discharge with respect to the battery device 22 is executed by performing control to change the direction of the current in the voltage converter 24. The change in the direction of the current in the voltage converter 24 can be performed by changing the actuation of the plurality of switching elements composing the voltage converter 24.

If it is determined, in step S14, that the battery device 22 is not under the warm-up control, it can be understood that the fuel cell 26 is in a normal operation state. Consequently, the process returns back to steps S10 and S12, and setting of the output voltage of the battery 22 with respect to the require power is performed in such a manner as to avoid the avoidance voltage region.

If it is determined, in step S14, that the battery device 22 is under the warm-up control, then it is further determined whether or not the battery device 22 is being discharged (S16). In this process, a discrimination is made as to whether the battery device 22 is being discharged (S18) or charged (S20). This determination can be made by determining whether the content of a command to execute the warm-up control supplied from the power supply control device 40 to the power supply circuit 20 is an instruction of forcible discharge or an instruction of forcible charge. For example, it is possible to determine whether the battery device 22 is at a particular moment being discharged or charged by comparing signals applied to the plurality of switching elements composing the voltage converter 24. Alternatively, such a determination can also be made by detecting the direction of the current in the voltage converter 24 by an appropriate current detection unit.

When the battery device 22 is being forcibly discharged, the setting of the FC output voltage is performed in the region with the threshold upper limit voltage $V_1$ or greater (S22). Specifically, the discharge time upper limit voltage $V_2$ is set between the OCV and $V_1$, and the range between $V_2$ and the OCV is set to a settable range at the time of discharge, as illustrated in FIG. 3.

When the battery device 22 is being forcibly charged, the FC output voltage is set to a value in the region with the threshold upper limit voltage $V_1$ or less (S24). Specifically, the settable range at the time of charge is set to $V_1$ or less. While this is the same as the output voltage setting condition at the time of the normal operation state of the fuel cell 26, the operating point is not defined in accordance with the required power P, and the output voltage is set within the region in which the value of the output current can be great so as to achieve rapid charging.

FIG. 4 is a view explaining the change over time of the state of each element when battery device 22 is under the warm-up control. In FIG. 4, the horizontal axis represents time, and the vertical axis sequentially indicates, from the upper level to the lower level, the battery power, the battery voltage, the SOC, the battery temperature, and the FC output voltage, in this order. Here, the battery power is the power to be supplied from the battery device 22 to the outside.

In FIG. 4, the leftmost section represents the normal operation state of the fuel cell 26, namely a state in which the warm-up control of the battery device 22 is not performed. In this state, the FC output voltage is set in the region with $V_1$ or less. This is illustrated as the hatched region in FIG. 4. Similarly, the hatched region concerning each section of the FC output voltage represents a region in which the FC output voltage can be set at the corresponding time.

In FIG. 4, the sections other than the leftmost section indicate a state in which the battery device 22 is under the warm-up control. More specifically, these sections illustrate that forcible discharging and forcible charging are repeated alternately, and that the battery temperature gradually increases as charging and discharging are repeated.

During the periods in FIG. 4 in which forcible discharging is being performed, the battery power supplied to outside is increased, the battery voltage is reduced, and the SOC is reduced. Here, the FC output voltage is set in the range of settable region at the time of discharge, which is OCV or less and $V_2$ or greater. As can be understood from FIG. 3, in this settable region at the time of discharge, the output current of the fuel cell 26 is smaller than that in the normal operation state of the fuel cell 26. For example, if the FC output voltage is set to a voltage very near the OCV, the output current of the fuel cell 26 can be substantially 0. As such, it is possible to maximize suppression of the current which might flow into the battery device 22 from the fuel cell 26 to charge the battery device 22 due to reduction of the battery voltage of the battery device 22.

The forcible discharge is interrupted when the SOC is reduced to a predetermined value, and is then changed to forcible charge.

In FIG. 4, during the time period in which the forcible charge is being performed, the battery power supplied to outside is decreased, the battery voltage is increased, and the SOC is increased. Here, the FC output voltage is set in the range of settable region at the time of charge, which is $V_1$ or less. In this case, as $V_1$ is the upper limit value, the FC output voltage can be set to any appropriate voltage which is $V_1$ or less. Accordingly, in order to perform charge speedily, it is desirable that the FC output voltage is reduced to increase the output current of the fuel cell 26.

The forcible charge is interrupted when the SOC is increased to a predetermined value, and is then changed to forcible discharge. With the repetition of the forcible charge and the forcible discharge alternately in this manner, the battery temperature is gradually increased. As illustrated in FIG. 2, during the repetition of the forcible discharge (S18, S22) and the forcible charge (S20, S24), whether or not the warm-up control is being performed is continuously monitored. When the warm-up control is being performed, the steps in S16, S18, S20, S22, and S24 are repeated, and when the warm-up control is terminated, the process returns to step S10 where the normal operation control of the fuel cell 26 is performed.

As described above, during the warm-up control of the battery device 22, the OCV avoidance control is released such that the output voltage of the fuel cell 26 can be set to values included in the avoidance voltage region. Consequently, it is possible to suppress the output current of the fuel cell 26 during the forcible discharge and increase the output current of the fuel cell 26 during the forcible charge, thereby making it possible to more rapidly warm up the battery device 22.

The invention claimed is:

1. A power supply control device, comprising: a unit which performs power distribution between a battery device and a fuel cell to set a target output voltage of the fuel cell corresponding to required power distributed to the fuel cell; an open circuit voltage avoidance unit which, when setting the target output voltage, sets the target output voltage, with a voltage range between an open circuit voltage of the fuel cell and a predetermined threshold upper limit voltage which is lower than the open circuit voltage being set as an avoidance voltage region; a unit which determines whether or not the battery device is under warm-up control by means of forcible charge or discharge; and an open circuit voltage avoidance release unit which, when it is determined that the battery device is under the warm-up control, set the target output voltage within a range including the avoidance voltage region.

2. The power supply control device according to claim 1, wherein
the open circuit voltage avoidance release unit makes a settable range at the time of discharge within which the target output voltage can be set during the forcible discharge of the battery device different from a settable range at the time of charge within which the target output voltage can be set during the forcible charge of the battery device.

3. The power supply control device according to claim 2, wherein
the open circuit voltage avoidance release unit sets the settable range at the time of discharge between the open circuit voltage and a predetermined discharge time threshold lower limit voltage which is smaller than the open circuit voltage and equal to or greater than the threshold upper limit voltage, and sets the settable range at the time of charge to a voltage which is equal to or less than the threshold upper limit voltage.

4. The power supply control device according to claim 1, comprising:
a battery device charge and discharge unit which executes forcible charge and discharge control in accordance with a temperature of the battery device or a state of charge of the battery device.

\* \* \* \* \*

UNITED STATES PATENT AND TRADEMARK OFFICE
CERTIFICATE OF CORRECTION

PATENT NO.       : 8,400,101 B2
APPLICATION NO. : 12/933487
DATED            : March 19, 2013
INVENTOR(S)      : Yoshida et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 361 days.

Signed and Sealed this
First Day of September, 2015

Michelle K. Lee
*Director of the United States Patent and Trademark Office*